United States Patent
Haas et al.

(10) Patent No.: US 6,499,343 B1
(45) Date of Patent: Dec. 31, 2002

(54) SYSTEM FOR AUTOMATICALLY MEASURING/ADJUSTING THE TIRE PRESSURE OF A MOTOR VEHICLE AND METHOD FOR MEASURING/ADJUSTING THE TIRE PRESSURE OF A MOTOR VEHICLE

(75) Inventors: Hardy Haas, Ditzingen (DE); Hubert Moeller, Paris (FR); Ian Faye, Stuttgart; Herbert Vollert, Lauffen/Neckar, both of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/600,008
(22) PCT Filed: Oct. 28, 1999
(86) PCT No.: PCT/DE99/03449
§ 371 (c)(1), (2), (4) Date: Aug. 31, 2000
(87) PCT Pub. No.: WO00/27678
PCT Pub. Date: May 18, 2000

(30) Foreign Application Priority Data

Nov. 9, 1998 (DE) .......................... 198 51 563

(51) Int. Cl.$^7$ .............................................. E01C 23/00
(52) U.S. Cl. ....................................................... 73/146
(58) Field of Search .............................. 73/146, 146.2, 73/146.3, 146.5, 146.8; 152/416, 417, 418; 340/442; 137/224, 226; 267/64.23

(56) References Cited

U.S. PATENT DOCUMENTS

| 5,325,902 A | * | 7/1994 | Loewe et al. | ............... | 152/419 |
| 5,327,346 A | * | 7/1994 | Goodell | ...................... | 364/426 |
| 5,587,698 A | * | 12/1996 | Genna | ......................... | 340/442 |
| 5,942,681 A | * | 8/1999 | Vollenweider et al. | ..... | 73/146.2 |
| 6,144,295 A | * | 11/2000 | Adams et al. | .............. | 340/442 |
| 6,212,464 B1 | * | 4/2001 | Skotnikov | ..................... | 701/82 |
| 6,269,691 B1 | * | 8/2001 | Sowatzke et al. | .......... | 73/146.2 |

FOREIGN PATENT DOCUMENTS

| DE | 33 08 080 | 9/1984 |
| GB | 2 323 453 | 9/1998 |
| WO | WO 94 03391 | 2/1994 |

* cited by examiner

Primary Examiner—Benjamin R. Fuller
Assistant Examiner—Jewel V. Thompson
(74) Attorney, Agent, or Firm—Kenyon & Kenyon

(57) ABSTRACT

An automatic vehicle tire pressure measurement/adjustment system for measuring and adjusting the tire pressure of a vehicle. The system includes an automatic handling unit having a pressure attachment positionable into a tire pressure measurement/adjustment position onto a valve of a tire, a tire pressure measurement device connectable to the pressure attachment for measuring the existing tire pressure, a determination device for determining a nominal tire pressure based on at least one vehicle-specific parameter, a first communication device located in the vehicle and connectable to the determination device for input of the at least one vehicle-specific parameter into the determination device, and a tire pressure adjustment device connectable to the pressure attachment and connectable to the determination device for transmitting the nominal tire pressure to establish a transmitted nominal tire pressure.

18 Claims, 1 Drawing Sheet

SYSTEM FOR AUTOMATICALLY MEASURING/ADJUSTING THE TIRE PRESSURE OF A MOTOR VEHICLE AND METHOD FOR MEASURING/ADJUSTING THE TIRE PRESSURE OF A MOTOR VEHICLE

FIELD OF THE INVENTION

The present invention relates to an automatic vehicle tire pressure measurement/adjustment system for measuring and adjusting the tire pressure of a vehicle, as well as a corresponding automatic vehicle tire pressure measurement/adjustment method. Although applicable to any vehicle, the exemplary embodiments of the present invention are explained with reference to a motor vehicle, such as, for example, a passenger car.

BACKGROUND INFORMATION

In general, it is believed that to achieve optimum driving characteristics, the tires of a vehicle should be inflated to a tire pressure that must lie, depending on specific parameters such as, for example, payload weight, air temperature, tire temperature, maximum speed, road condition, etc., within a narrow pressure range, such as, for example 2.8 bar±0.05 bar.

Tire pressure is a critical parameter, in particular, for the performance of motor vehicle systems such as, for example, the antilock braking system (ABS), automatic slip control system (ASR), and electronic stability program (ESP), so that a tire pressure monitoring system or regular checking and correct adjustment of the tire pressure, for example following any change in loading, can contribute appreciably to a gain in vehicle safety.

Certain companies may have been offering tire pressure monitoring systems that are built into the vehicle and that warn the driver when the pressure in one or more tires is too low or too high, such as, for example, by way of a corresponding warning light.

Such tire pressure monitoring systems may operate on the basis of estimates or direct measurements. They may operate almost continuously over time, and can warn the driver immediately in the event of a pressure loss.

A substantial disadvantage of these systems, however, is the reliability achievable so far that can be offered at the present day at reasonable cost. In addition, the driver must himself or herself take action once a pressure loss has been recognized, and undertake corresponding measures. This may be troublesome, since tire pressure correction requires an intervention that is strenuous (especially for older persons) and may be associated with soiling of the hands.

The tire pressure adjustment systems set up at filling stations may be in poor condition, with the result that the desired tire pressure cannot be established accurately.

Accurate determination of the nominal tire pressure presents a further problem. This is may be done by way of tables displayed at the filling station or in the vehicle. Automatic units located permanently at filling stations, with pressure measurement functions and pressure calculation functions, are not believed to be presently available.

Since present-day filling stations are developing more and more into meeting points and service locations, it would be desirable if an automatic tire pressure measurement/adjustment system were also part of a kind of "all-round service package" (along with further services such as automatic fueling, general cleaning, fluid checks, etc.).

SUMMARY OF THE INVENTION

The automatic vehicle tire pressure measurement system of the present invention and the corresponding automatic vehicle tire pressure measurement method of the present invention are believed to have the advantage as compared to other approaches to the problem that they make possible automatic vehicle-related tire pressure monitoring without troublesome manual action or calculation by the driver.

This is a convenience system for vehicle servicing. In principle, it can be used to adjust the tire pressure automatically each time a filling station is visited, thus guaranteeing optimum vehicle performance.

The exemplary embodiment of the present invention provides an automatic tire pressure measurement/adjustment system for a vehicle at a (motor) vehicle service location (e.g. a filling station), although in purely theoretical terms it can also be part of the vehicle itself (this variant of the system would be conceivable in particular for commercial vehicles that have a compressed-air supply system). The exemplary embodiment of the present invention provides, in particular, for communication between the vehicle and the vehicle tire pressure measurement/adjustment system in order to determine a tire pressure that is optimum for the specific vehicle.

The exemplary embodiment of the present invention concerns the automatic measurement and adjustment of tire pressure on the basis of vehicle-related data such as, for example, previous travel conditions, payload weight, etc. The measured tire air temperature, as well as non-vehicle-related parameters such as, for example, intended maximum speed, road condition on the route of travel, outside air temperature, and weather forecast, can also be taken into account by way of corresponding inputs when the nominal tire pressure is determined.

According to an exemplary embodiment, the vehicle-specific parameter is selected from the following group: vehicle model, tire type (e.g. manufacturer or summer/winter tires), vehicle mass, number of vehicle occupants, vehicle operating information.

According to another exemplary embodiment, a second communication device is provided that is connectable to the determination device for input of at least one non-vehicle-specific parameter, the determination device being configured such that it determines the nominal tire pressure in consideration of at least one non-vehicle-specific parameter.

According to another exemplary embodiment, the non-vehicle-specific parameter is selected from the following group: intended maximum speed, road condition on the intended route of travel, outside air temperature, and weather forecast.

According to another exemplary embodiment, the tire pressure measurement device has a tire air temperature measurement device for measuring the tire air temperature, the determination device being configured such that it determines the nominal tire pressure in consideration of the measured tire air temperature. Errors in establishing the air pressure in the tires, e.g. release of air because a heated tire simulates a higher pressure, can thereby be prevented.

According to another exemplary embodiment, the automatic handling unit has a valve cap threader device for screwing the valve cap on and off.

According to a further preferred development, the automatic vehicle tire pressure measurement/adjustment system is installed at a filling station in the vicinity of a fuel pump and can be activated while the vehicle is being fueled. This has the advantage that the tire pressure check then involves absolutely no additional effort from the driver's point of view.

According to another exemplary embodiment, the first communication device is connectable to an onboard computer of the vehicle. The vehicle-specific parameter(s) can thus be taken from a memory belonging to the onboard computer or can be modified therein, e.g. if one tire type is replaced with a different tire type that requires different pressures.

According to another exemplary embodiment, the first communication device is connectable to a mass estimation device, located in the vehicle, with which the vehicle mass can be estimated, preferably from the vehicle's curb weight and a drive torque needed to achieve a specific acceleration.

According to another exemplary embodiment, a gradient correction device is provided to determine a gradient correction for the mass estimation device.

According to another exemplary embodiment, the determination device is configured such that it determines the nominal tire pressure in consideration of a GPS altitude measurement.

According to another exemplary embodiment, the determination device is configured such that it determines the nominal tire pressure on the basis of a table stored therein.

According to another exemplary embodiment, the automatic handling unit is movable along a rail device. It is thus sufficient to make one mechanical robot available for all the tires of a vehicle.

According to another exemplary embodiment, a transfer device that is connectable to the determination device is provided, and is configured such that it transfers the nominal tire pressure, and/or a difference between the nominal tire pressure and the existing tire pressure, to the vehicle for storage and/or display therein.

According to another exemplary embodiment, there is provided in the vehicle an analysis device which is configured such that it analyzes the frequency and/or magnitude of the differences transferred and prepares therefrom, in consideration of any possible change in the differences, an advisory as to tire problems. For example, a pressure loss of 0.1 bar/month is usual. If losses are greater, there may be a leak, about which the driver is then informed.

According to another exemplary embodiment, the determination device is arranged outside the vehicle and the communication device is connectable thereto via a wireless interface, preferably an infrared interface or a radio interface.

According to another exemplary embodiment, the determination device is arranged inside the vehicle and is connectable to the tire pressure adjustment device via a wireless interface, preferably an infrared interface or a radio interface.

DETAILED DESCRIPTION

Figure 1:
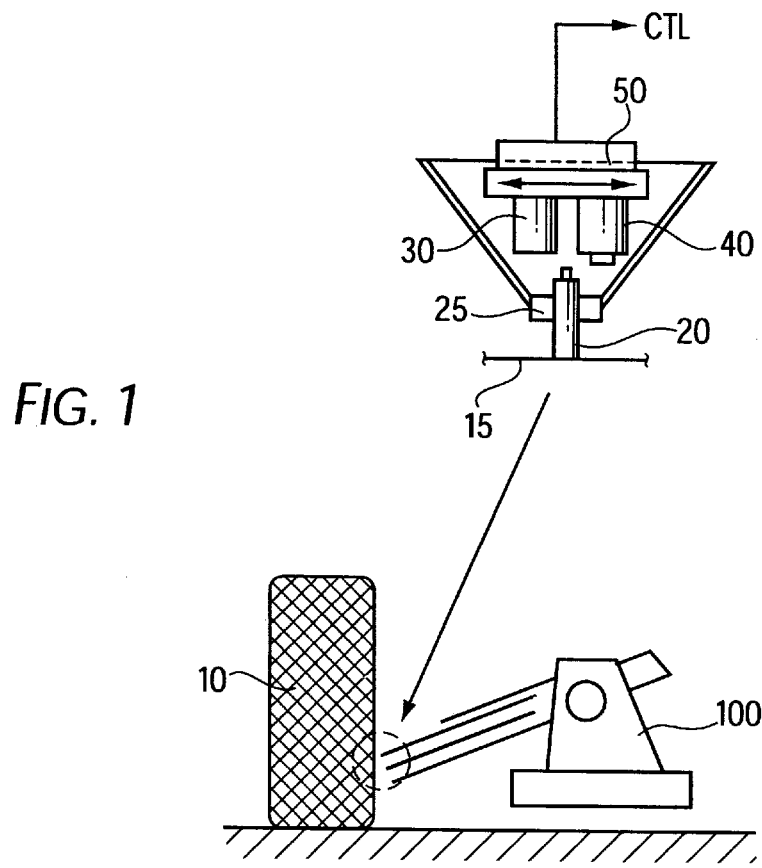
FIG. 1 shows a schematic side view of the automatic vehicle tire pressure measurement/adjustment system according to an exemplary embodiment of the present invention.
Figure 2:
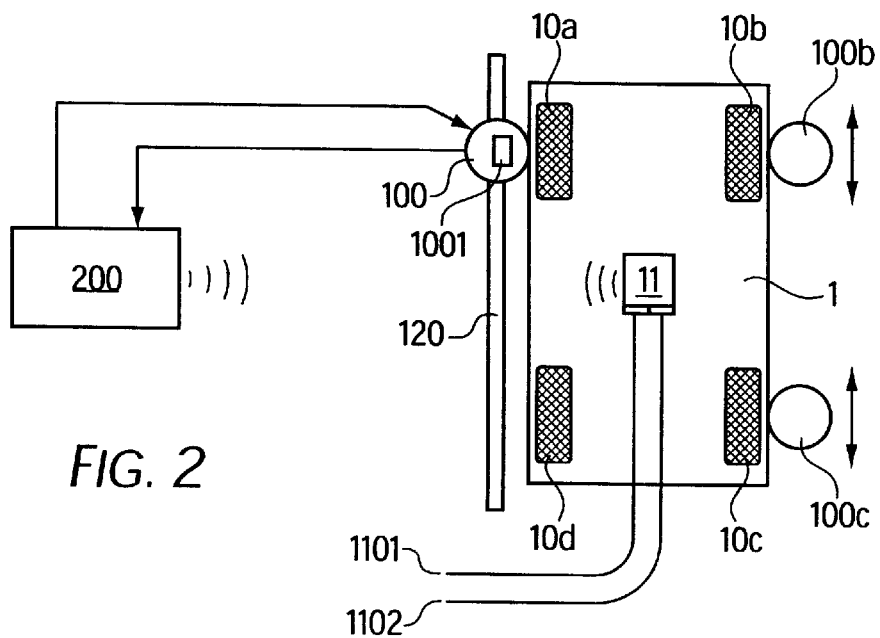
FIG. 2 shows a schematic top view of the automatic vehicle tire pressure measurement/adjustment system of FIG. 1.

FIG. 1 shows a schematic side depiction, and FIG. 2 a top depiction, of an exemplary embodiment of the automatic vehicle tire pressure measurement/adjustment system according to the present invention.

In FIGS. 1 and 2, 1 designates a vehicle; 10, 10a, 10b, 10c, 10d tires of vehicle 1; 100, 100b, 100c an automatic handling unit; 11 an infrared communication device; 120 a rail; 15 a wheel rim; 20 a valve; 25 a clamping device; 30 a pressure attachment; 40 a valve cap threader; 50 a positioning device; and CTL a control device (not depicted).

According to this exemplary embodiment, the automatic vehicle tire pressure measurement/adjustment system for measuring and adjusting the tire pressure of vehicle 1 is installed at a filling station in the vicinity of a fuel pump and can be activated while vehicle 1 is being fueled.

Automatic handling unit 100 can be positioned on valve 20 of tire 10 in a tire pressure measurement/adjustment position. For this purpose, clamping device 20 is first guided over the valve stem and clamped thereonto. This can be done by way of contact sensors or optical image recognition methods. If necessary, valve cap threader 40 can be guided by way of positioning device 50 to the valve cap, and can unscrew it before the tire pressure check and then thread it back on. As is evident from FIG. 2, automatic handling unit 100 can be movable along rail device 120 or can be provided separately for each of the (in this case four) vehicle tires (depicted as 100b, 100c), or two units could, for example, service one side of vehicle 1. The first alternative is more economical; the second operates more quickly.

Also by way of positioning device 50, pressure attachment 30 can be placed sealingly onto the valve. A tire pressure measurement device (not shown) that is connectable to pressure attachment 30 measures the existing tire pressure. The tire pressure measurement device has a tire air temperature measurement device to measure the tire air temperature, so that the determination device can determine the nominal tire pressure in consideration of the measured tire air temperature.

A determination device (also not depicted) mounted outside the vehicle serves to determine the nominal tire pressure in consideration of the vehicle-specific parameters: vehicle model, tire type, vehicle mass, number of vehicle occupants, and possible further vehicle operating data, for example the integrated value of the duration and speed of the trip, which is an indication as to whether cold or hot tires may be expected.

These vehicle-specific parameters can be transferred, with first communication device 11 (located in the vehicle) in the form of an infrared transmitter connected to the onboard computer, to the determination device located outside the vehicle, which advantageously is part of control device CTL.

A tire pressure adjustment device 1001, which is connectable to pressure attachment 30 and connectable to the determination device in order to transmit the nominal tire pressure, serves to establish the transmitted nominal tire pressure. The tire pressure adjustment device 1001 is integrated into the automatic handling device 100. The determination device is in contact with the tire pressure adjustment device for transmission of the actual and setpoint air pressure.

A second communication device can additionally be provided inside or outside the vehicle; it is connectable to the determination device for input of at least one non-vehicle-specific parameter, the determination device being configured such that it determines the nominal tire pressure in consideration of the at least one non-vehicle-specific parameter, which for example represents the intended maximum speed, the road condition of the intended route of travel, or the outside air temperature or weather forecast.

Also located in the vehicle is a mass estimation device 1001 with which the vehicle mass can be estimated from the vehicle's curb weight and a drive torque (at a specific transmission setting) necessary to achieve a specific acceleration. First communication device 11 is connectable to the mass estimation device in order to be able to forward the value to the determination device.

Optionally, mass estimation device 1002 can be connectable to a gradient correction device 1002 in order to determine a gradient correction; it determines the mass estimate in consideration of the gradient correction.

An example of the execution of a tire pressure measurement/adjustment operation might be as follows:

Vehicle 1 is first parked in front of the fuel pump, and fueling is begun. This initiates automatic positioning of valve cap threader 40 and unscrewing of the valve cap, if present. Pressure attachment 30 is then moved onto valve 20 of tire 1 into a tire pressure measurement/adjustment position. Pressure attachment 30 connects to valve 20 by way of a suitable adapter.

A communication then takes place from communication device 11 in the vehicle to the determination device in the automatic unit, transferring the following data: vehicle model, vehicle loading based on a mass estimate with gradient correction, number of occupants based on sensor data, GPS altitude measurement, previous road conditions.

The necessary nominal tire pressure is calculated therefrom on the basis of a previously defined function, or defined from a previously stored table.

The tire pressure and tire air temperature are then measured. The existing tire pressure measured in this fashion is compared to the determined nominal tire pressure, as determined by the determination device from the transferred parameters and the tire air temperature.

Air is then added or released accordingly.

Lastly, status information is returned to the driver; provided for this purpose is a transfer device, connectable to the determination device, which is configured such that it transfers the nominal tire pressure, and/or a difference between the nominal tire pressure and the existing tire pressure, to vehicle 1 for storage and display therein.

An analysis device which is configured such that it analyzes the frequency and/or magnitude of transferred differences is provided in vehicle 1. It prepares therefrom, in consideration of any possible change in the differences, an advisory as to tire problems.

Although the present invention has been described above with reference to an exemplary embodiment, it is not limited thereto but rather can be modified in any suitably appropriate way.

Although, in the above example, the determination device is provided outside the vehicle and a vehicle-specific parameter is transferred via the infrared interface, the determination device can also be arranged inside the vehicle and a tire pressure command value can be transferred directly.

In particular, this depends on which parameters are utilized to determine the nominal tire pressure, and how they can be obtained. For example, if the tire air temperature is to be incorporated into the determination of the nominal tire pressure, a distinction must be made as to whether it is measurable by a corresponding sensor inside or outside the vehicle. In the former case, the determination device is advantageously also arranged inside the vehicle; in the latter case it is not.

The examples of the parameters that can be taken into consideration for pressure calculation are also not limited to the parameters indicated, but can be expanded as desired.

The system according to the present invention also functions not only for capped standard valves, but also for any other uncapped or other special valves.

The communications indicated can, of course, also take place via a CAN bus system or other bus system, and are not limited to wireless communications.

APPENDIX

List of reference characters

| | |
|---|---|
| 1 | Vehicle |
| 10; 10a, 10b, 10c, 10d | Tires |
| 100; 100b, 100c | Automatic handling unit |
| 11 | Infrared communication device |
| 120 | Rail |
| 15 | Wheel rim |
| 20 | Valve |
| 25 | Clamping device |
| 30 | Pressure attachment |
| 40 | Valve cap threader |
| 50 | Positioning device |
| CTL | Control device |

What is claimed is:

1. An automatic vehicle tire pressure system for measuring and adjusting a tire pressure of a vehicle, the system comprising:

an automatic handling unit having a pressure attachment positioned into at least one of a tire pressure measurement position and a tire pressure adjustment position on a valve of a tire of the vehicle;

a tire pressure measurement device connected to the pressure attachment for measuring the tire pressure;

a determination device for determining a nominal tire pressure based on at least one vehicle-specific parameter;

a first communication device located in the vehicle, where the first communication device transfers the at least one vehicle-specific parameter into the determination device; and a tire pressure adjustment device connected to the pressure attachment and where the tire pressure adjustment device transmits a nominal tire pressure to the determination device to establish a transmitted nominal tire pressure.

2. The system of claim 1, wherein the vehicle-specific parameter includes at least one of a vehicle model, tire type information, a vehicle mass, a number of vehicle occupants, and vehicle operating information.

3. The system of claim 1, further comprising:

a second communication device connectable to the determination device for input of at least one non-vehicle-specific parameter;

wherein the determination device determines the nominal tire pressure based on the at least one non-vehicle-specific parameter.

4. The system of claim 3, wherein the at least one non-vehicle-specific parameter includes at least one of an intended maximum speed, a road condition associated with an intended travel route, an outside air temperature, and a weather forecast.

5. The system of claim 1, wherein:
the tire pressure measurement device includes a tire air temperature measurement device for measuring the tire air temperature; and
the determination device determines the nominal tire pressure based on a measured tire air temperature.

6. The system of claim 1, wherein the automatic handling unit includes a valve cap threader device for at least one of screwing and unscrewing a valve cap.

7. The system of claim 1, wherein the system is installed at a filling station in a vicinity of a fuel pump and can be activated while the vehicle is being fueled.

8. The system of claim 1, wherein the first communication device is connected to an onboard computer of the vehicle.

9. The system of claim 1, wherein the first communication device is connected to a mass estimation device, the mass estimation device being located in the vehicle and being for estimating a vehicle mass based on at least one of a vehicle curb weight and a drive torque associated with a specific acceleration.

10. The system of claim 9, further comprising a gradient correction device to determine a gradient correction for the mass estimation device.

11. The system of claim 1, wherein the determination device determines the nominal tire pressure based on a GPS altitude measurement.

12. The system of claim 1, wherein the determination device determines the nominal tire pressure using a table stored therein.

13. The system of claim 1, wherein the automatic handling unit is movable along a rail device.

14. The system of claim 1, further comprising a transfer device connectable to the determination device for transferring at least one of the nominal tire pressure and a difference between the nominal tire pressure and an existing tire pressure to the vehicle for at least one of storage and display.

15. The system of claim 14, wherein the vehicle includes an analysis device for analyzing at least one of a frequency of transferred differences and a magnitude of the transferred differences and for providing a tire problem advisory based on changes in the transferred differences.

16. The system of claim 1, wherein the determination device is arranged outside the vehicle and is connected to the communication device via at least one of a wireless interface, an infrared interface and a radio interface.

17. The system of claim 1, wherein the determination device is arranged inside the vehicle and is connected to the tire pressure adjustment device via at least one of a wireless interface, an infrared interface and a radio interface.

18. An automatic vehicle tire pressure method for measuring and adjusting the tire pressure of a vehicle, the method comprising the steps of:

positioning the vehicle;

automatically positioning a pressure attachment into at least one of a tire pressure measurement position and a tire pressure adjustment position on a valve of a tire of the vehicle;

inputting at least one vehicle-specific parameter into a determination device using a first communication device located in the vehicle;

determining a nominal tire pressure based on the at least one vehicle-specific parameter by using the determination device;

measuring an existing tire pressure using a tire pressure measurement device connectable to the pressure attachment;

comparing a determined nominal tire pressure to the existing tire pressure; and establishing the determined nominal tire pressure, if there is a difference between the determined nominal tire pressure and the existing tire pressure, by using a tire pressure adjustment device, which is connectable to the pressure attachment and which is connectable to the determination device, to transmit the determined nominal tire pressure.

* * * * *